(12) United States Patent
Kato (10) Patent No.: US 7,508,443 B2
(45) Date of Patent: Mar. 24, 2009

(54) IMAGE SENSING APPARATUS WITH LIGHT EMITTING DEVICE, METHOD OF CONTROLLING LIGHT EMITTING DEVICE, IMAGE SENSING METHOD OF IMAGE SENSING APPARATUS, AND STORAGE MEDIUM STORING IMAGE SENSING APPARATUS CONTROL PROGRAM

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 840 days.

(21) Appl. No.: 10/477,578

(22) PCT Filed: Feb. 18, 2003

(86) PCT No.: PCT/JP03/01705

§ 371 (c)(1),
(2), (4) Date: Nov. 12, 2003

(87) PCT Pub. No.: WO03/071789

PCT Pub. Date: Aug. 28, 2003

(65) Prior Publication Data

US 2004/0135923 A1     Jul. 15, 2004

(30) Foreign Application Priority Data

Feb. 20, 2002   (JP)   ............................. 2002-043167

(51) Int. Cl.
  *H04N 5/222*  (2006.01)
  *H04N 5/235*  (2006.01)
  *H04N 5/225*  (2006.01)

(52) U.S. Cl. .................. 348/371; 348/370; 348/362; 348/216.1; 348/217.1; 348/229.1

(58) Field of Classification Search ................ 348/371, 348/364, 349, 370, 207.99, 362, 363, 216.1, 348/217.1, 220.1, 221.1, 222.1, 223.1, 224.1, 348/228.1, 229.1, 234, 254, 255; 358/240, 358/107, 209, 909
See application file for complete search history.

(56) References Cited

U.S. PATENT DOCUMENTS 5,010,412 A * 4/1991 Garriss ....................... 348/371
5,016,107 A * 5/1991 Sasson et al. ............ 348/231.1
5,987,261 A   11/1999 Sugahara et al.

(Continued)

FOREIGN PATENT DOCUMENTS

JP           6-217190 A        8/1994

(Continued)

*Primary Examiner*—David L Ometz
*Assistant Examiner*—Peter Chon
(74) *Attorney, Agent, or Firm*—Frishauf, Holtz, Goodman & Chick, P.C.

(57) ABSTRACT

The peak of a histogram in a first flash preemission and the peak of a histogram in a second flash preemission performed with a light emission amount different from that of the first flash preemission are obtained, and the change ratio of the histogram peak value with respect to a change in flash light emission amount is calculated. By taking this change ratio into consideration, a flash light emission amount for image sensing is calculated. Image sensing is performed by causing the flash to emit light with this image sensing light emission amount.

13 Claims, 5 Drawing Sheets

U.S. PATENT DOCUMENTS

| | | |
|---|---|---|
| 6,095,661 A | 8/2000 | Lebens et al. |
| 6,151,073 A * | 11/2000 | Steinberg et al. ............ 348/371 |
| 6,272,292 B1 * | 8/2001 | Iwasaki et al. ............. 396/157 |
| 6,753,920 B1 * | 6/2004 | Momose et al. ............. 348/371 |
| 7,164,446 B2 * | 1/2007 | Konishi ..................... 348/349 |
| 2001/0019364 A1 | 9/2001 | Kawahara |

FOREIGN PATENT DOCUMENTS

| | | |
|---|---|---|
| JP | 6-217191 A | 8/1994 |
| JP | 2000-338563 A | 12/2000 |
| JP | 2001-296578 A | 10/2001 |

* cited by examiner

IMAGE SENSING APPARATUS WITH LIGHT EMITTING DEVICE, METHOD OF CONTROLLING LIGHT EMITTING DEVICE, IMAGE SENSING METHOD OF IMAGE SENSING APPARATUS, AND STORAGE MEDIUM STORING IMAGE SENSING APPARATUS CONTROL PROGRAM

This application is a U.S. National Phase Application under 35 USC 371 of International Application PCT/JP03/01705 filed Feb. 18, 2003.

TECHNICAL FIELD

The present invention relates to an image sensing apparatus with a light emitting device, a method of controlling the light emitting device, an image sensing method, and an image sensing apparatus control program.

BACKGROUND ART

The following methods are conventionally used to control or determine a light emission amount when an image is sensed by using a flash of an image sensing apparatus.

First method: Flash light is emitted toward an object to receive the reflected light from the object by a sensor. When the obtained integral value has reached a defined value, the light emission is stopped.

Second method: Preemission is performed once, and the brightness of an object at that time is loaded by an image sensor. On the basis of this loaded condition, the light amount for image sensing is determined.

Third method: Preemission is repeated a number of times, and the light emission amount for image sensing is determined by integrating the brightness.

In the first method, however, the sensor for receiving the reflected light from an object is necessary in addition to the image sensor. This is disadvantageous in making the image sensing apparatus compact and reducing the cost. Also, no correct light amount can be obtained by the sensor depending on the reflectance or position of an object.

In the second method, no correct light amount can be determined unless the object's brightness indicated by the reflected light obtained by preemission is appropriate (not too bright or not too dark).

To solve these problems, the light amount of preemission can be selected on the basis of distance information. However, the determined light amount for image sensing can be inappropriate in some cases owing to calculation errors of the distance information. Also, this method cannot be performed if a distance information collecting means such as auto-focusing is omitted in order to make the image sensing apparatus compact or reduce the cost.

In the third method, electricity and time are wasted by a number of times of preemission. Time is wasted especially when a light emitting device (e.g., a light emitting device using an LED as a light emitting means) which emits weak light and requires a long irradiation time is used.

The present invention relates to a light emitting device for an image sensing apparatus, an image sensing apparatus with a light emitting device, and an image sensing method which have been made to solve the above conventional problems.

DISCLOSURE OF INVENTION

One preferred aspect of the present invention is an image sensing apparatus with a light emitting device, comprising:

light emitting means;

an image sensor on which an object image is formed;

preemission control means for causing the light emitting means to perform preemission twice with different light emission amounts;

first calculating means for calculating a change ratio of brightness with respect to a change in the light emission amount, on the basis of an image sensing signal from the image sensor in each of the two light emitting operations;

second calculating means for calculating a correct light emission amount of the light emitting means when image sensing is to be performed, on the basis of the brightness change ratio calculated by the first calculating means; and image sensing light emission control means for causing, during image sensing, the light emitting means to emit light with the correct light emission amount calculated by the second calculating means.

Another preferred aspect of the present invention is an image sensing apparatus with a light emitting device, comprising:

light emitting means;

an image sensor on which an object image is formed;

amplifying means for amplifying an image sensing signal from the image sensor;

preemission control means for causing the light emitting means to perform preemission twice with the same light emission amount, and changing the amplification amount of the amplifying means in one of the two preemitting operations;

first calculating means for calculating a change ratio of brightness with respect to a change in the amplification amount, on the basis of the image sensing signals obtained in the two light emitting operations and differently amplified by the amplifying means;

second calculating means for calculating a correct amplification factor of the amplifying means when image sensing is to be performed, on the basis of the brightness change ratio calculated by the first calculating means; and image sensing light emission control means for causing, during image sensing, the light emitting means to emit light with the aforementioned light emission amount, and controlling the amplifying means to have the amplification factor calculated by the second calculating means.

Still another preferred aspect of the present invention is a light emitting device control method comprising:

the preemission control step of causing light emitting means of an image sensing apparatus to perform preemission twice for different light emission times;

the first calculation step of calculating a change ratio of brightness with respect to a change in light emission amount, on the basis of an image sensing signal from an image sensor in each of the two light emitting operations;

the second calculation step of calculating a correct light emission amount of the light emitting means when image sensing is to be performed, on the basis of the brightness change ratio calculated in the first calculation step; and the image sensing light emission control step of causing, during image sensing, the light emitting means to emit light with the correct light emission amount calculated in the second calculation step.

Still another preferred aspect of the present invention is an image sensing method of an image sensing apparatus, comprising:

the preemission control step of causing light emitting means of the image sensing apparatus to perform preemission twice with the same light emission amount, and amplifying an image signal in one of the two preemitting operations by a changed amplification amount;

the first calculation step of calculating a change ratio of brightness with respect to a change in the amplification amount, on the basis of the image sensing signals obtained in the two light emitting operations and differently amplified in the preemission control step;

the second calculation step of calculating a correct amplification factor when image sensing is to be performed, on the basis of the brightness change ratio calculated in the first calculation step; and the image sensing light emission control step of causing, during image sensing, the light emitting means to emit light with the aforementioned light emission amount, and amplifying the image sensing signal by the correct amplification factor calculated in the second calculation step.

Still another preferred aspect of the present invention is a recording medium recording an image sensing apparatus control program which allows a controller of the image sensing apparatus including light emitting means and an image sensor on which an object image is formed, to function as:

preemission control means for causing the light emitting means to perform preemission twice with different light emission amounts;

first calculating means for calculating a change ratio of brightness with respect to a change in the light emission amount, on the basis of an image sensing signal from the image sensor in each of the two light emitting operations;

second calculating means for calculating a correct light emission amount of the light emitting means when image sensing is to be performed, on the basis of the brightness change ratio calculated by the first calculating means; and image sensing light emission control means for causing, during image sensing, the light emitting means to emit light with the correct light emission amount calculated by the second calculating means.

Still another preferred aspect of the present invention is a recording medium recording an image sensing apparatus control program which allows a controller of the image sensing apparatus including light emitting means, an image sensor on which an object image is formed, and amplifying means for amplifying an image sensing signal from the image sensor, to function as:

preemission control means for causing the light emitting means to perform preemission twice with the same light emission amount, and changing the amplification amount of the amplifying means in one of the two preemitting operations;

first calculating means for calculating a change ratio of brightness with respect to a change in the amplification amount, on the basis of the image sensing signals obtained in the two light emitting operations and differently amplified by the amplifying means;

second calculating means for calculating a correct amplification factor of the amplifying means when image sensing is to be performed, on the basis of the brightness change ratio calculated by the first calculating means; and image sensing light emission control means for causing, during image sensing, the light emitting means to emit light with the aforementioned light emission amount, and controlling the amplifying means to have the amplification factor calculated by the second calculating means.

Still another preferred aspect of the present invention is an image sensing apparatus with a light emitting device, comprising:

light emitting means including an LED element;

an image sensor on which an object image is formed;

preemission control means for causing the light emitting means to perform preemission twice with different light emission amounts;

first calculating means for calculating a change ratio of brightness with respect to a change in the light emission amount, on the basis of an image sensing signal from the image sensor in each of the two light emitting operations;

second calculating means for calculating a correct light emission amount of the light emitting means when image sensing is to be performed, on the basis of the brightness change ratio calculated by the first calculating means; and image sensing light emission control means for causing, during image sensing, the light emitting means to emit light with the correct light emission amount calculated by the second calculating means.

Still another preferred aspect of the present invention is an image sensing apparatus with a light emitting device, comprising:

light emitting means including a discharge tube;

an image sensor on which an object image is formed;

preemission control means for causing the light emitting means to perform preemission twice with different light emission intensities;

first calculating means for calculating a change ratio of brightness with respect to a change in the light emission intensity, on the basis of an image sensing signal from the image sensor in each of the two light emitting operations;

second calculating means for calculating a correct light emission intensity of the light emitting means when image sensing is to be performed, on the basis of the brightness change ratio calculated by the first calculating means; and image sensing light emission control means for causing, during image sensing, the light emitting means to emit light with the correct light emission intensity calculated by the second calculating means.

BEST MODE FOR CARRYING OUT THE INVENTION

Figure 1:
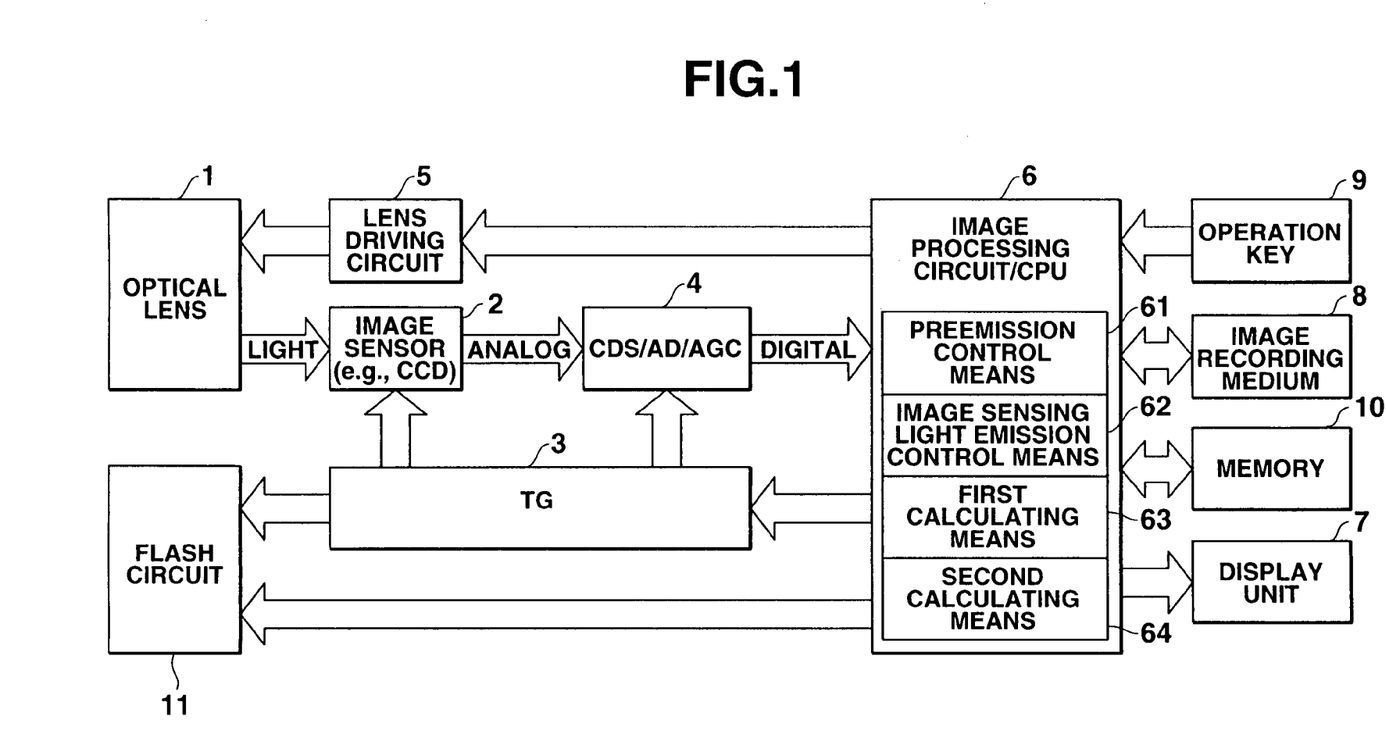
FIG. 1 is block diagram showing blocks of a digital still camera common to the first and second embodiments.

An embodiment of the present invention will be described below with reference to the accompanying drawings. FIG. 1 is a block diagram showing the electrical circuit configuration of a digital still camera according to this embodiment. This digital still camera has an optical lens 1, an image sensor 2 such as a CCD on which an image is formed by the optical lens 1, a TG (Timing Generator) 3 for driving the image sensor 2, and a unit circuit 4 which includes a CDS (Correlated Double Sampling) unit for holding an image sensing signal output from the image sensor 2, an AGC (Automatic Gain Controller) for amplifying the image sensing signal, and an ADC (Analog-to-Digital Converter) for converting the amplified image sensing signal into a digital signal. The optical lens 1 is held by a lens driving circuit 5 which includes an AF motor and the like. When this lens driving circuit 5 is driven under the control of an image processing circuit/CPU (Central Processing Unit) 6, the optical lens 1 moves along the optical axis direction and adjusts focusing of the object image formed on the image sensor 2. During AE control, the image sensor 2 is driven by the TG 3 on the basis of a shutter pulse supplied from the image processing circuit/CPU 6, and the charge storage time of this image sensor 2 is controlled. This realizes an electronic shutter.

The image processing circuit/CPU 6 is a controller having various signal processing and image processing functions. This image processing circuit/CPU 6 generates a video signal from an image sensing signal converted into a digital signal by the unit circuit 4, and causes a display unit 7 such as a TFT liquid crystal monitor to display an object image sensed by the image sensor 2 as a through image. During image sensing, the image processing circuit/CPU 6 compresses an image sensing signal to generate an image file having a predetermined format, and stores the image file in an image recording medium 8 such as a flash memory. To play back the stored image, the image processing circuit/CPU 6 expands the compressed image file and displays the image on the display unit 7.

Furthermore, this image processing circuit/CPU 6 is connected to an operation key unit 9 including various keys such as a shutter key, a memory 10, and a flash circuit 11.

In this embodiment, particularly the image processing circuit/CPU 6 functions as a preemission control means 61, image sensing light emission control means 62, and first and second calculating means 63 and 64, in addition to performing the various signal processing and image processing functions.

The memory 10 is a program ROM recording operation programs necessary for control of the individual units and various data processing operations performed by the image processing circuit/CPU 6. In this embodiment, the memory 10 particularly stores programs for allowing the image processing circuit/CPU 6 to function as the preemission control means, image sensing light emission control means, and first and second calculating means of the present invention.

In this embodiment, the flash circuit 11 includes an LED (Light Emitting Diode) as a light emitting means. A light emission signal is supplied to this flash circuit 11 from the image processing circuit/CPU 6 via the TG 3, and the light emitting means emits light only while this signal is output. That is, the light emitting means starts emitting light when this signal changes to High, and stops the light emission when the signal changes to Low. The light amount is proportional to the emission time. An image of an object illuminated by the flash light from the LED is formed on the image sensor 2 via the optical lens 1, and the image sensor 2 outputs a signal. This output signal from the image sensor 2 is sampled, amplified, and digitized by the unit circuit 4, and supplied to the image processing circuit/CPU 6. The image processing circuit/CPU 6 converts the signal into luminance, and performs luminance integration and histogram processing.

The memory 10 can also be a memory in which stored data such as a program can be rewritten where necessary. In addition, the programs and data described above can also be partially stored in the image recording medium 8.

The operation when image sensing is performed by the digital still camera with the above arrangement will be explained below with reference to a timing chart shown in FIG. 2 and a flowchart shown in FIG. 3. This flowchart shows the operation in an image sensing standby state when a capture mode (image sensing mode) in which a through image is displayed on the display unit 7 is selected.

Figure 2:
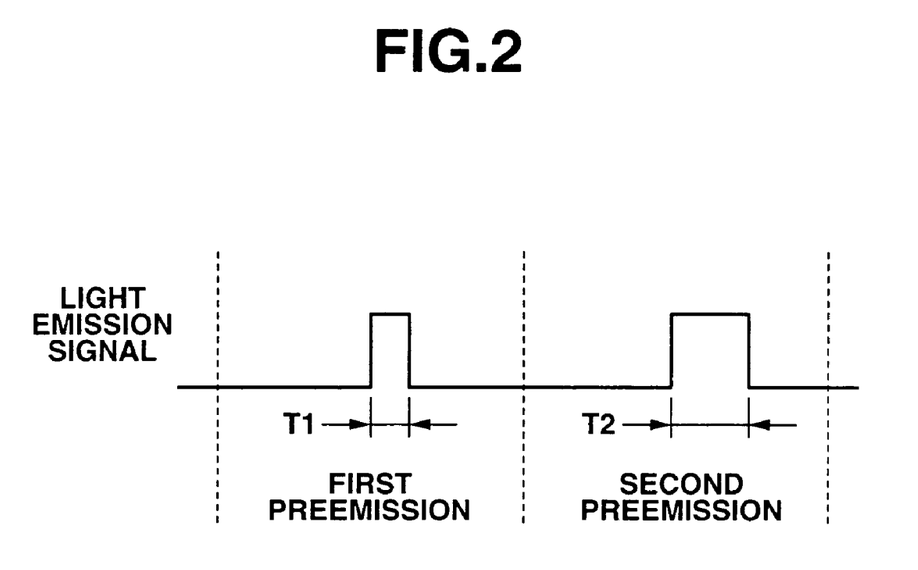
FIG. 2 is a timing chart showing the light emission time in the first embodiment.
Figure 3:
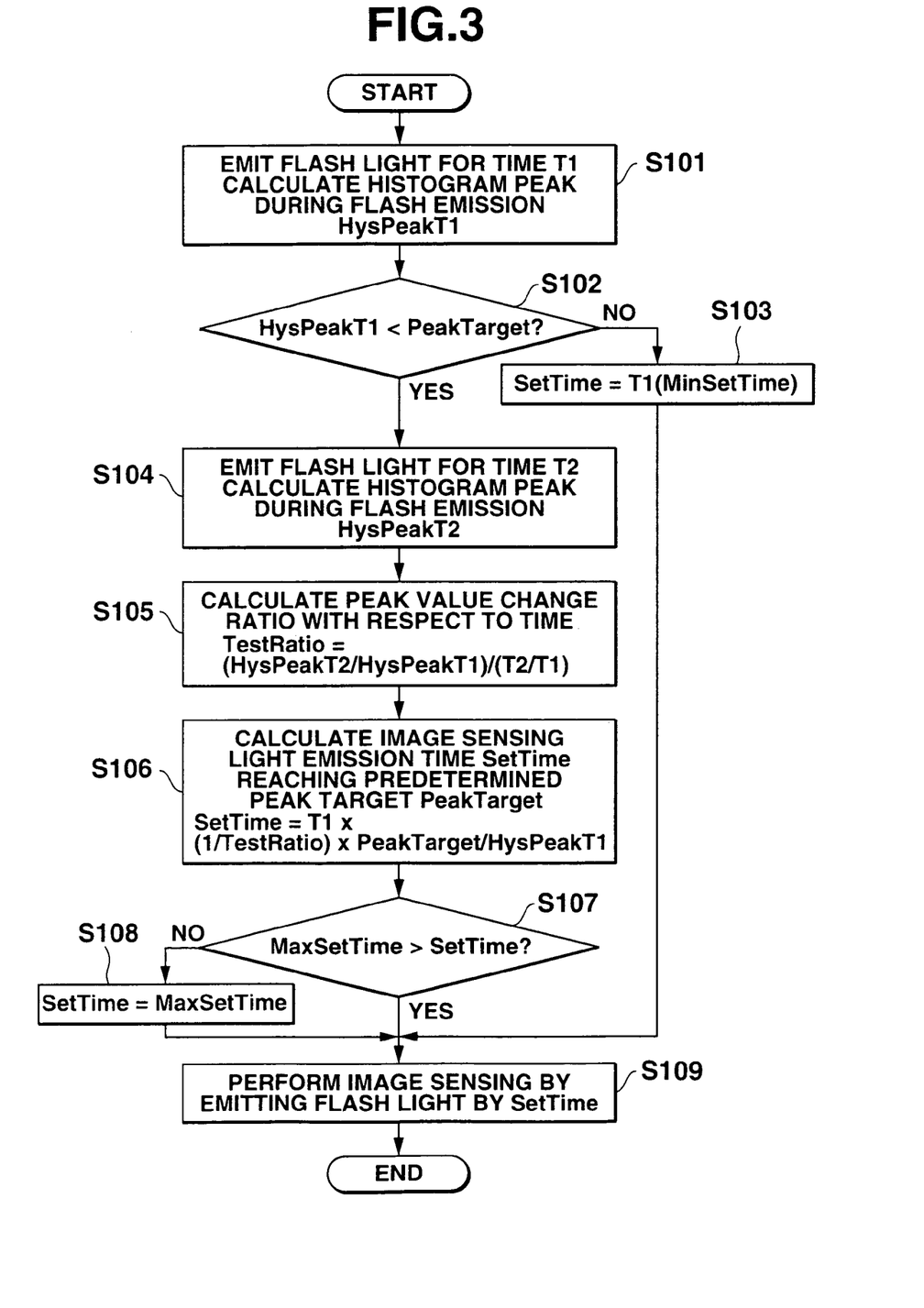
FIG. 3 is a flow chart showing the operation of the first embodiment.

When the shutter key is pressed to the first stroke, for example, the digital still camera drives the flash circuit 11 to perform first preemission for a predetermined time T1 as shown in FIG. 2. By using an image sensing signal (digital signal) supplied from the image sensor 2 via the unit circuit 4 when this first preemission is performed, the image processing circuit/CPU 6 calculates the highest luminance existence value (histogram peak) of histograms. As a condition for determining this histogram peak (highest value), a percentage with respect to the total number of histograms is predetermined. If a value exists at a percentage equal to or higher than this predetermined percentage, this value is determined as the histogram peak. Also, the time T1 is preferably a minimum time during which light emission is possible, in order to prevent saturation when a histogram is checked. The determined histogram peak is set as HysPeakT1 (step S101).

Then, this histogram highest value data HysPeakT1 obtained for the light emission time T1 is compared with a predetermined peak (highest) existence value (target highest histogram value) PeakTarget, thereby checking (determining) whether this target value is already exceeded by the light emission for the light emission time T1 (step S102). If it is confirmed (determined) in step S102 that the HysPeakT1 has already exceeded the PeakTarget (step S102; NO), an image sensing light emission time SetTime is set to T1 (step S103).

When the shutter key is pressed to the second stroke, for example, flash light emission image sensing is performed by the SetTime (step S109). That is, the LED of the flash circuit 11 is allowed to emit light for the SetTime, an image is loaded by the image sensor 2, and this image (object image) is sensed. Data of the sensed image from the unit circuit 4 is compressed and saved in the image recording medium 8.

On the other hand, if it is confirmed (determined) in step S102 that the HysPeakT1 has not exceeded the PeakTarget (step S102; YES), as shown in FIG. 2, second preemission is performed for a time T2 longer than the time T1. Similar to the processing in step S101 described above, a digital signal supplied from the image sensor 2 via the unit circuit 4 when this second preemission is performed is used to calculate the highest histogram luminance existence value (histogram peak), and this histogram peak is set as HysPeakT2 (step S104).

Then, the HysPeakT1, HysPeakT2, and light emission times T1 and T2 are used to calculate a change ratio TestRatio of the histogram peak (highest) value with respect to a change in light emission time (step S105) by $$\text{TestRatio} = (\text{HysPeak}T2/\text{HysPeak}T1)/(T2/T1) \qquad (1)$$

By the calculation of this TestRatio, the change ratio of the object's brightness with respect to a change in light amount can be confirmed.

In addition, by taking this TestRatio into consideration, an image sensing light emission time SetTime during which the highest histogram value data HysPeakT1 for the light emission time T1 in the first preemission changes to the predetermined target peak value PeakTarget is calculated (step S106) by $$\text{SetTime} = T1 \times (1/\text{TestRatio}) \times \text{PeakTarget}/\text{HysPeak}T1 \qquad (2)$$

The calculated SetTime is compared with a predetermined maximum light emission time MaxSetTime. If the SetTime is equal to or larger than the MaxSetTime (step S107; NO), this SetTime is limited to the MaxSetTime (step S108). If the SetTime is less than the MaxSetTime (step S107; YES), this SetTime is directly held. The flash light emission image sensing described earlier is performed for either SetTime corresponding to the determination in step S107 (step S109).

In this embodiment, therefore, preemission need only be performed twice without requiring any sensor or distance information, and correct light amount control can be performed for the reflected light from an object without wasting any electricity or time.

In this embodiment, the SetTime is calculated by using equation (2) in step S106. However, if correction of, e.g., a γ curve is performed when a sensed image is formed, the Set-Time must be corrected by an inverse γ curve which cancels the γ curve.

In this embodiment, the light emission time of the second preemission is set to be longer than that of the first preemission. However, similar control can be performed even when the light emission time of the second preemission is set to be shorter than that of the first preemission.

In this embodiment, an LED is used as the light emitting means. However, the present invention is, of course, readily applicable even when another light emitting means such as a discharge tube represented by a flash tube is used.

To control the light emission amount when an LED or discharge tube is used as the light emitting means, the method of controlling the light emission amount by the light emission time as in this embodiment is preferred. This is so because the light emission amount can be controlled more easily when the light emission time is used than when the current amount is used.

If, however, a plurality of LEDs or discharge tubes are formed and light emission of these LEDs or discharge tubes can be selectively controlled, the emission intensity of each of these light emitting elements can be controlled to control the light emission amount.

When an incandescent lamp is used as the light emitting means, the light emission amount of the lamp can be controlled by controlling one or both of the light emission time and light emission intensity.

Figure 4:
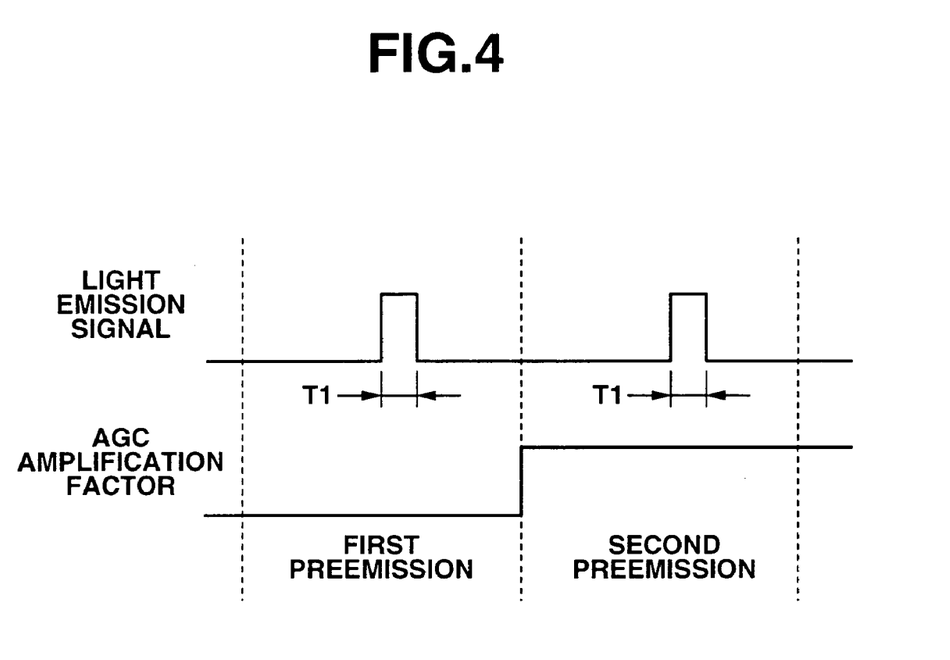
FIG. 4 is a timing chart showing the light emission time in the second embodiment.
Figure 5:
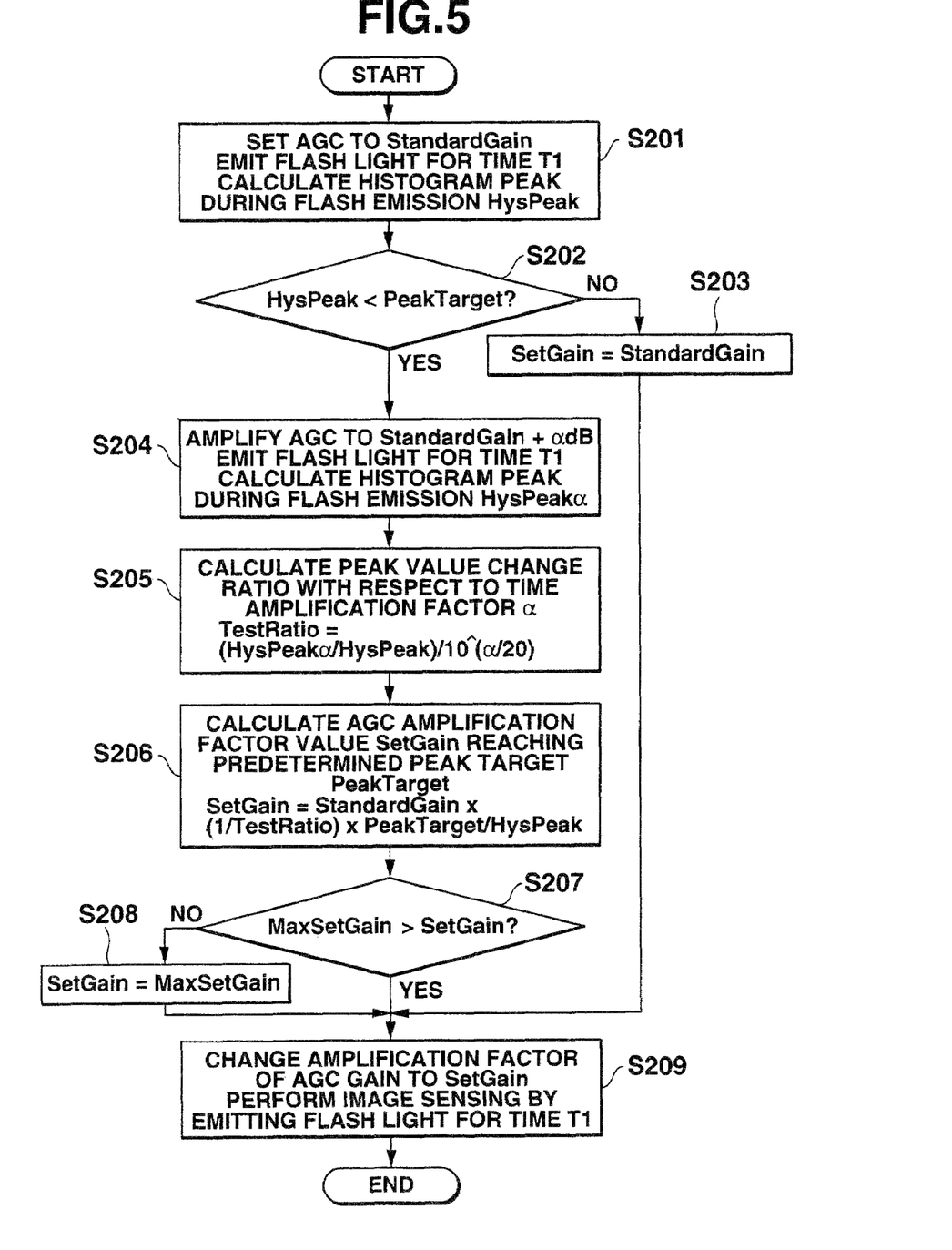
FIG. 5 is a flow chart showing the operation of the second embodiment.

FIGS. 4 and 5 illustrate another embodiment of the present invention in which an optimum amplification factor for flash image sensing is calculated by changing the amplification factor of an AGC in a unit circuit 4 without changing the light emission time of second preemission.

That is, when a shutter key is pressed to the first stroke, for example, a digital still camera sets the amplification factor of the AGC in the unit circuit 4 to a standard value StandardGain. Also, the digital still camera drives a flash circuit 11 to perform first preemission for a predetermined time T1 as shown in FIG. 4. By using an image sensing signal (digital signal) supplied from an image sensor 2 via the unit circuit 4 when this first preemission is performed, an image processing circuit/CPU 6 calculates the highest luminance existence value (histogram peak) of histograms. As a condition for determining this histogram peak (highest value), a percentage with respect to the total number of histograms is predetermined. If a value exists at a percentage equal to or higher than this predetermined percentage, this value is determined as a histogram peak. Also, the time T1 is preferably a minimum time during which light emission is possible, in order to prevent saturation when a histogram is checked. The determined histogram peak is set as HysPeak (step S201).

Then, this highest histogram value data HysPeak obtained for the light emission time T1 is compared with a predetermined peak (highest) existence value (target highest histogram value) PeakTarget, thereby checking (determining) whether this target value is already exceeded by the light emission for the light emission time T1 (step S202). If it is confirmed (determined) in step S202 that the HysPeak has already exceeded the PeakTarget (step S202; NO), an amplification factor SetGain of the AGC gain for image sensing is set to the standard value StandardGain (step S203).

When the shutter key is pressed to the second stroke, for example, the amplification factor of the AGC gain in the unit circuit 4 is set to the SetGain, and an image is sensed by causing the flash to emit light for the time T1 (step S209). That is, an LED of the flash circuit 11 is allowed to emit light for the time T1, an image is loaded by the image sensor 2, and this image (object image) is sensed. Data of the sensed image amplified by the amplification factor SetGain is obtained by the unit circuit 4. This data is compressed and saved in an image recording medium 8.

On the other hand, if it is confirmed (determined) in step S202 that the HysPeak has not exceeded the PeakTarget (step S202; YES), as shown in FIG. 4, the AGC amplification factor is set to StandardGain+αdB, and second preemission is performed for the same time T1. Similar to the processing in step S201 described above, an image sensing signal (digital signal) supplied from the image sensor 2 via the unit circuit 4 when this second preemission is performed is used to calculate the highest histogram luminance existence value (histogram peak), and this histogram peak is set as HysPeakα (step S204).

Then, the HysPeakα, HysPeak, and α are used to calculate a change ratio TestRatio of the histogram peak (highest) value with respect to the amplification factor α (step S205) by $$TestRatio = (HysPeak\alpha/HysPeak)/10^{\wedge}(\alpha/20) \quad (3)$$

By the calculation of this TestRatio, the change ratio of the object's brightness with respect to a change in amplification factor can be confirmed.

In addition, by taking this TestRatio into consideration, an amplification factor value SetGain of the AGC gain by which the highest histogram value data HysPeak for the light emission time T1 reaches the predetermined target peak value PeakTarget is calculated (step S206) by $$SetGain = StandardGain \times (1/TestRatio) \times PeakTarget/HysPeak \quad (4)$$

The calculated SetGain is compared with a predetermined maximum value MaxSetGain. If the SetGain is equal to or larger than the MaxSetGain (step S207; NO), this SetGain is limited to the MaxSetGain (step S208). If the SetGain is less than the MaxSetGain (step S207; YES), this SetGain is directly held. Image sensing is performed by causing the flash to emit light for the time T1 by changing the amplification factor of the AGC gain in the unit circuit 4 to either SetGain corresponding to the determination in step S207 (step S209).

In this embodiment, therefore, preemission need only be performed twice without requiring any sensor or distance information, and correct light amount control can be performed for the reflected light from an object without wasting any electricity or time. The method according to this embodiment is particularly effective for an LED flash having a small light amount.

In this embodiment, the SetGain is calculated by using equation (4) in step S206. However, if correction of, e.g., a γ curve is performed when a sensed image is formed, the Set-Gain must be corrected by an inverse γ curve which cancels the γ curve. This is the same as in the first embodiment described above.

Also, ① if it is possible to determine in advance that an image of an object at a distance at which the flash light does not reach is to be sensed, or ② if it is determined by the method of the first embodiment described earlier that the flash light has not reached an object, by setting various modes such as auto-focusing, the optimum amplification factor is calculated by the method of the second embodiment. Consequently, the image of the object can be sensed and recorded with optimum brightness even at a distance at which the flash light does not reach.

In this embodiment, an LED is used as the light emitting means. However, the present invention is, of course, readily applicable even when another light emitting means such as a discharge tube represented by a flash tube is used.

The invention claimed is:

1. An image pickup apparatus comprising:
   a light emitting element;
   an image sensor which forms an image of an object to be shot and outputs image pickup signals;
   a first light emission control unit which causes the light emitting element to perform a first preliminary light emission with a first light emission amount and a second preliminary light emission with a second light emission amount that is different from the first light emission amount;
   a first calculation unit which calculates a first brightness of the object based on a first image pickup signal output from the image sensor at the first preliminary light emission and a second brightness of the object based on a second image pickup signal output from the image sensor at the second preliminary light emission;
   a second light emission control unit which causes the light emitting element to stop any preliminary light emission after the second preliminary light emission irrespective of the first brightness and the second brightness calculated by the first calculation unit;
   a second calculation unit which calculates a brightness change ratio between the first brightness and the second brightness calculated by the first calculation unit;
   a third calculation unit which calculates an appropriate light emission amount of the light emitting element for shooting based on the brightness change ratio calculated by the second calculation unit; and
   a third light emission control unit which causes the light emitting element to emit light at the appropriate light emission amount calculated by the third calculation unit when shooting.

2. An image pickup apparatus according to claim 1, wherein the second calculation unit performs the calculation based on a luminance distribution in a histogram of the image pickup signals.

3. An image pickup apparatus according to claim 1, wherein the first light emission control unit causes the light emitting element to perform the first preliminary light emission with the first light emission amount by controlling a light emission time.

4. An image pickup apparatus according to claim 1, further comprising an image processing circuit which compresses an image pickup signal obtained when the light emitting element is caused to emit light by the third light emission control unit, and which stores the compressed image pickup signal in a storage means.

5. An image pickup apparatus according to claim 1, wherein the first light emission control unit causes the light emitting element to perform the second preliminary light emission with the second light emission amount by controlling a light emission time.

6. An image pickup apparatus comprising:
   an image sensor which forms an image of an object to be shot and outputs an image pickup signal;
   an amplification unit which amplifies the image pickup signal output by the image sensor;
   a first amplification control unit which causes the amplification unit to perform a first preliminary amplification of the image pickup signal with a first amplification rate and a second preliminary amplification of the image pickup signal with a second amplification rate which is different from the first amplification rate;
   a first calculation unit which calculates a first brightness of the object based on the image pickup signal output from the image sensor at the first preliminary amplification and a second brightness of the object based on the image pickup signal output from the image sensor at the second preliminary amplification;
   a second amplification control unit which causes the amplification unit to stop preforming any preliminary amplification after the second preliminary amplification irrespective of the first brightness and the second brightness calculated by the first calculation unit;
   a second calculation unit which calculates a brightness change ratio between the first brightness and the second brightness calculated by the first calculation unit;
   a third calculation unit which calculates an appropriate amplification rate based on the brightness change ratio calculated by the second calculation unit; and
   a third amplification control unit which causes the amplification unit to amplify the image pickup signal at the appropriate amplification rate calculated by the third calculation unit.

7. An image pickup apparatus according to claim 6, wherein the second calculation unit calculates the brightness change ratio based on: (i) the first amplification rate and the second amplification rate, and (ii) a histogram of the image pickup signal amplified by the first preliminary amplification and a histogram of the image pickup signal amplified by the second preliminary amplification.

8. The image pickup apparatus according to claim 6, further comprising a light emitting element,
   wherein the first amplification control unit controls the image pickup signal, which is output from the image sensor when light is emitted by the light emitting element, to be amplified with the first amplification rate.

9. The image pickup apparatus according to claim 6, further comprising a light emitting element,
   wherein the first amplification control unit controls the image pickup signal, which is output from the image sensor when light is emitted by the light emitting element, to be amplified with the second amplification rate.

10. A light emitting element control method comprising:
   causing a light emitting element of an image pickup apparatus to perform a first preliminary light emission with a first light emission time and a first light emission amount;
   causing the light emitting element of the image pickup apparatus to perform a second preliminary light emission with a second light emission time, which is different from the first light emission time, and a second light emission amount;
   calculating a first brightness an object based on a first image pickup signal output from an image sensor at the first preliminary light emission and a second brightness of the object based on a second image pickup signal output from the image sensor at the second preliminary light emission;
   causing the light emitting element to stop any preliminary light emission after the second preliminary light emission irrespective of the calculated first brightness and the calculated second brightness;

calculating a brightness change ratio between the first brightness and the second brightness;

calculating an appropriate light emission amount of the light emitting element for shooting based on the calculated brightness change ratio; and causing the light emitting element to emit light at the calculated appropriate light emission amount.

11. An image pickup method comprising:

controlling an amplification device to perform a first preliminary amplification of an image pickup signal output by an image sensor with a first amplification rate;

controlling the amplification device to perform a second preliminary amplification of the image pickup signal output by the image sensor with a second amplification rate different from the first amplification rate;

calculating a first brightness of an object based on the image pickup signal output by the image sensor at the first preliminary amplification and a second brightness of the object based on the image pickup signal output by the image sensor at the second preliminary amplification;

causing the amplification device to stop performing any preliminary amplification after the second preliminary amplification irrespective of the calculated first brightness and the calculated second brightness;

calculating a brightness change ratio between the first brightness and the second brightness;

calculating an appropriate amplification rate based on the calculated brightness change ratio; and controlling the amplification device to amplify the image pickup signal at the calculated appropriate amplification rate.

12. A computer readable medium encoded with a computer program for controlling an image pickup apparatus, which includes a light emitting element and an image sensor that forms an image of an object to be shot, said computer program controlling the image pickup apparatus to perform functions comprising:

causing the light emitting element to perform a first preliminary light emission with a first light emission amount;

causing the light emitting element to perform a second preliminary light emission with a second light emission amount which is different from the first light emission amount;

calculating a first brightness of the object based on a first image pickup signal output from the image sensor at the first preliminary light emission and a second brightness of the object based on a second image pickup signal output from the image sensor at the second preliminary light emission;

causing the light emitting element to stop any preliminary light emission after the second preliminary light emission irrespective of the calculated first brightness and the calculated second brightness;

calculating a brightness change ratio between the first brightness and the second brightness;

calculating an appropriate light emission amount of the light emitting element for shooting based on the calculated brightness change ratio; and causing the light emitting element to emit light at the calculated appropriate light emission amount.

13. A computer readable medium encoded with a computer program for controlling an image pickup apparatus, which includes an image sensor that forms an image of an object to be shot, and an amplification device which amplifies an image pickup signal from the image sensor, said computer program controlling the image pickup apparatus to perform functions comprising:

controlling the amplification device to perform a first preliminary amplification of the image pickup signal with a first amplification rate;

controlling the amplification device to perform a second preliminary amplification of the image pickup signal with a second amplification rate different from the first amplification rate;

calculating a first brightness of the object based on the image pickup signal output by the image sensor at the first preliminary amplification and a second brightness of the object based on the image pickup signal output by the image sensor at the second preliminary amplification;

causing the amplification device to stop performing any preliminary amplification after the second preliminary amplification irrespective of the calculated first brightness and the calculated second brightness;

calculating a brightness change ratio between the first brightness and the second brightness;

calculating an appropriate amplification rate based on the calculated brightness change ratio; and controlling the amplification device to amplify the image pickup signal at the calculated appropriate amplification rate.

* * * * *